United States Patent
Zhao et al.

(10) Patent No.: US 11,104,452 B2
(45) Date of Patent: Aug. 31, 2021

(54) GIMBAL, IMAGING DEVICE AND UNMANNED AERIAL VEHICLE

(71) Applicant: SZ DJI TECHNOLOGY CO., LTD., Shenzhen (CN)

(72) Inventors: Xifeng Zhao, Shenzhen (CN); Rongjian Sun, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/851,700

(22) Filed: Apr. 17, 2020

(65) Prior Publication Data

US 2020/0239158 A1    Jul. 30, 2020

Related U.S. Application Data

(63) Continuation of application No. 15/911,941, filed on Mar. 5, 2018, now Pat. No. 10,625,877, which is a (Continued)

(51) Int. Cl.
    *H04N 5/335* (2011.01)
    *B64D 47/08* (2006.01)
    (Continued)

(52) U.S. Cl.
    CPC ............ *B64D 47/08* (2013.01); *B64C 39/024* (2013.01); *F16M 11/041* (2013.01);
    (Continued)

(58) Field of Classification Search
    CPC .... B64D 47/08; B64C 39/024; F16M 11/041; F16M 11/10; F16M 11/123;
    (Continued)

(56) References Cited

U.S. PATENT DOCUMENTS

2009/0216394 A1    8/2009    Heppe et al.
2013/0048792 A1    2/2013    Szarek et al.
(Continued)

FOREIGN PATENT DOCUMENTS

CN    102602543 A    7/2012
CN    203823376 U    9/2014
(Continued)

OTHER PUBLICATIONS

The World Intellectual Property Organization (WIPO) International Search Report for PCT/CN2015/088990, dated May 30, 2016, 6 Pages (including translation).

*Primary Examiner* — Usman A Khan
(74) *Attorney, Agent, or Firm* — Anova Law Group, PLLC

(57) ABSTRACT

A gimbal includes a rotatable frame assembly configured to be electrically connected to a camera, and a quick release structure configured to detachably mount the camera to the frame assembly. The quick release structure includes an engaging member configured to be coupled to the camera and a fixing part configured to be coupled to the frame assembly and detachably connected to the engaging member. The engaging member includes a connecting surface configured to face away from the camera, an elastic member fixed on the connecting surface, and a first connector fixed on the elastic member. The fixing part includes a connecting plate and a second connector fixed on the connecting plate. A rotation of at least a portion of the fixing part with respect to the engaging member allows the first connector to be electrically coupled to or decoupled from the second connector.

20 Claims, 6 Drawing Sheets

Related U.S. Application Data continuation of application No. PCT/CN2015/088990, filed on Sep. 6, 2015.

(51) Int. Cl.
| | | |
|---|---|---|
| *F16M 13/02* | (2006.01) | |
| *F16M 11/04* | (2006.01) | |
| *F16M 11/10* | (2006.01) | |
| *F16M 11/18* | (2006.01) | |
| *F16M 11/20* | (2006.01) | |
| *B64C 39/02* | (2006.01) | |
| *F16M 11/12* | (2006.01) | |
| *G03B 15/00* | (2021.01) | |
| *G03B 17/56* | (2021.01) | |

(52) U.S. Cl.
CPC ........... *F16M 11/10* (2013.01); *F16M 11/123* (2013.01); *F16M 11/18* (2013.01); *F16M 11/2071* (2013.01); *F16M 13/022* (2013.01); *G03B 15/006* (2013.01); *G03B 17/561* (2013.01); *B64C 2201/127* (2013.01); *B64C 2201/146* (2013.01)

(58) Field of Classification Search
CPC .................. F16M 11/2071; G03B 15/006; G03B 17/563; G03B 17/561; H04N 5/225
USPC .................................. 348/144, 373
See application file for complete search history.

(56) References Cited

U.S. PATENT DOCUMENTS

2014/0205276 A1* 7/2014 Johnston ................ F16M 13/04
396/421
2016/0352992 A1 12/2016 Saika et al.

FOREIGN PATENT DOCUMENTS

| CN | 203902846 U | 10/2014 |
|---|---|---|
| CN | 204056308 U | 12/2014 |
| CN | 204250379 U | 4/2015 |
| CN | 204279973 U | 4/2015 |
| CN | 104787350 A | 7/2015 |
| CN | 204548517 U | 8/2015 |
| CN | 205045000 U | 2/2016 |
| WO | 2015165022 A1 | 11/2015 |

\* cited by examiner

GIMBAL, IMAGING DEVICE AND UNMANNED AERIAL VEHICLE

CROSS-REFERENCE TO RELATED APPLICATIONS

This application is a continuation of application Ser. No. 15/911,941, filed on Mar. 5, 2018, which is a continuation of International Application No. PCT/CN2015/088990, filed on Sep. 6, 2015, the entire contents of both of which are incorporated herein by reference.

TECHNICAL FIELD

The present disclosure relates to imaging devices, and more particularly to a gimbal having a quick release structure, and an imaging device and an unmanned aerial vehicle (UAV) having the gimbal.

BACKGROUND OF THE DISCLOSURE

A camera is generally fixed to a gimbal. The user can determine if a gimbal is to be attached in view of actual needs. However, dedicated tools are necessary to assemble and disassemble the gimbal, causing inconvenience to the user.

SUMMARY OF THE DISCLOSURE

There is a need for a gimbal that can be quickly assembled and disassembled and electrically connected to a camera element, and an imaging device and an unmanned aerial vehicle (UAV) having the gimbal.

An aspect of the disclosure discloses a gimbal for connecting a camera element, comprising a rotatable frame assembly and a quick release structure. The camera element can be detachably mounted on the frame assembly via the quick release structure. Each of the camera element and the frame assembly can be provided with a connector, such that the camera element can be electrically connected to the gimbal via the connectors when the camera element is mounted to the frame assembly.

In some embodiments, the frame assembly can comprise a first frame to which the camera element can be detachably mounted via the quick release structure. The camera element can be electrically connected to the gimbal via the connectors when the camera element is mounted to the first frame.

In some embodiments, the frame assembly can further comprise a second frame rotatably connected to the first frame. The second frame can be connected to a body of an unmanned aerial vehicle.

In some embodiments, the frame assembly can further comprise a third frame rotatably connected to the second frame. The second frame can be rotatably connected to the body via the third frame.

In some embodiments, a rotation axis of the first frame, a rotation axis of the second frame and a rotation axis of the third frame can be perpendicular to each other.

In some embodiments, the gimbal can further comprise a connecting member and a motor, the connecting member being connected to the body. The third frame can be rotatably connected to the body via the motor.

In some embodiments, the quick release structure can comprise a fixing part connected to the frame assembly and an engaging member detachably connected to the fixing part, the engaging member connecting the camera element to the fixing part. The engaging member can abut against or release from the fixing part to bring the quick release structure into a locked state or a detached state.

In some embodiments, the fixing part can comprise a rotating member, a fixing member and a connecting plate, the fixing member being sleeved in the rotating member, the rotating member being connected to the connecting plate via the fixing member, and the connecting plate being connected to the frame assembly. The rotating member can mate with the engaging member to bring the quick release structure into the locked state or the detached state.

In some embodiments, the rotating member can be rotatable with respect to the fixing member. A rotation of the rotating member abuts or releases the rotating member with the engaging member to bring the quick release structure into the locked state or the detached state.

In some embodiments, the rotating member can be a cylinder having a through hole provided therethrough, the rotating member comprising a first end facing the connecting plate and a second end opposite to the first end, and a boss extending from an inner wall of the rotating member in proximity to the first end. The fixing member can be a cylinder having a through hole provided therethrough, the fixing member comprising a third end facing the connecting plate and a fourth end opposite to the third end, the fourth end can be a step surface extending from the third end. The fixing member can be sleeved in the rotating member, and the fourth end can abut the boss of the rotating member, such that the fixing member can be prevented from releasing from the rotating member and a rotation of the rotating member relative to the fixing member about an axis of the rotating member can be enabled.

In some embodiments, at least one protrusion can be provided on the inner wall of the rotating member. At least one ridge can be provided on a circumference of the engaging member. A rotation of the rotating member relative to the fixing member can cause each one of the at least one ridge to abut against or disengage from a respective one of the at least one protrusion to bring the quick release structure into the locked state or the detached state.

In some embodiments, each of the at least one protrusion can comprise a fitting surface facing the camera element, and an abutting surface can be provided on a side of each of the at least one ridge facing the camera element. The abutting surface can mate with the fitting surface to bring the quick release structure into the locked state or the detached state.

In some embodiments, the fitting surface can be an inclined surface inclined at a predetermined angle with respect to a rotation axis of the rotating member, and/or
the abutting surface can be an inclined surface inclined at the predetermined angle with respect to the rotation axis of the rotating member.

In some embodiments, a sliding slot can be formed between the at least one protrusion and the at least one ridge, and an access opening in communication with the sliding slot can be formed at the rotating member. The ridge can enter into or retreat from the sliding slot via the access opening.

In some embodiments, the sliding slot can be an arc-shaped slot, and/or
the access opening can be an arc-shaped slot.

In some embodiments, three said protrusions can be provided. One access opening can be formed between two adjacent protrusions.

In some embodiments, a protruding ring can be formed on an inner wall of the fixing member at a position in proximity to the third end, a first positioning hole can be provided on the protruding ring, and the engaging member can comprise a connecting surface facing the rotating member and a first positioning post provided on the connecting surface. The first positioning post can be inserted into the first positioning hole when the engaging member is locked with the rotating member.

In some embodiments, the connectors can comprise a first connector provided on the connecting plate and a second connector provided on the engaging member. The first connector can be coupled to the second connector when the engaging member is locked with the rotating member to provide an electrical connection between the camera element and the gimbal.

In some embodiments, the engaging member can further comprise an elastic member, the elastic member being fixed on the connecting surface, and the first connector being fixed on the elastic member. The elastic member can be compressed under a pressure of the rotating member when the quick release structure is in the locked state.

In some embodiments, the elastic member can be a shock-absorbing pad.

In some embodiments, a second positioning hole can be provided on the first connector, and a second positioning post can be provided on the second connector. The second positioning post can be inserted into the second positioning hole when the quick release structure is in the locked state.

In some embodiments, the rotating member can further comprise a shifting part protruding from an outer wall of the rotating member.

In some embodiments, the shifting part can be a trapezoidal boss.

In some embodiments, the rotating member can comprise a plug, an end of the plug protruding from the inner wall of the rotating member, and a restraining part can be provided on an outer wall of the fixing member. The restraining part can mate with the plug to limit a rotation of the rotating member relative to the fixing member.

In some embodiments, a connecting hole can be provided on the shifting part through which the end of the plug can protrude from the inner wall of the rotating member.

In some embodiments, the plug can comprise an end face and a tip retractably projected from the end face.

In some embodiments, the tip can be provided with a spherical shape.

In some embodiments, the restraining part can comprise a first restraining hole, a second restraining hole and a guiding groove, the first restraining hole and the second restraining hole being respectively provided at two opposite ends of the guiding groove. The plug can slide along the guiding groove when the rotating member is rotated with respect to the fixing member, and the rotation of the rotating member relative to the fixing member is stopped when the plug reaches the first restraining hole or the second restraining hole.

In some embodiments, the plug can abut against a bottom surface of the guiding groove and can be elastically compressed when sliding along the guiding groove. The plug can be engaged into the first restraining hole or the second restraining hole under its own restoring force when the plug reaches the first restraining hole or the second restraining hole.

Another aspect of the disclosure discloses an imaging device comprising a gimbal and a camera element, the gimbal comprising a rotatable frame assembly and a quick release structure. The camera element can be detachably mounted on the frame assembly via the quick release structure. Each of the camera element and the frame assembly can be provided with a connector, such that the camera element can be electrically connected to the gimbal via the connectors when the camera element is mounted on the frame assembly.

In some embodiments, the frame assembly can comprise a first frame to which the camera element can be detachably mounted via the quick release structure. The camera element can be electrically connected to the gimbal via the connectors when the camera element is mounted to the first frame.

In some embodiments, the frame assembly can further comprise a second frame rotatably connected to the first frame. The second frame can be connected to a body of an unmanned aerial vehicle.

In some embodiments, the frame assembly can further comprise a third frame rotatably connected to the second frame. The second frame can be rotatably connected to the body via the third frame.

In some embodiments, a rotation axis of the first frame, a rotation axis of the second frame and a rotation axis of the third frame can be perpendicular to each other.

In some embodiments, the gimbal can further comprise a connecting member and a motor, the connecting member being connected to the body. The third frame can be rotatably connected to the body via the motor.

In some embodiments, the quick release structure can comprise a fixing part connected to the frame assembly and an engaging member detachably connected to the fixing part, the engaging member connecting the camera element to the fixing part. The engaging member can abut against or release from the fixing part to bring the quick release structure into a locked state or a detached state.

In some embodiments, the fixing part can comprise a rotating member, a fixing member and a connecting plate, the fixing member being sleeved in the rotating member, the rotating member being connected to the connecting plate via the fixing member, and the connecting plate being connected to the frame assembly. The rotating member can mate with the engaging member to bring the quick release structure into the locked state or the detached state.

In some embodiments, the rotating member can be rotatable with respect to the fixing member. A rotation of the rotating member can abut or release the rotating member with the engaging member to bring the quick release structure into the locked state or the detached state.

In some embodiments, the rotating member can be a a cylinder having a through hole provided therethrough, the rotating member comprising a first end facing the connecting plate and a second end opposite to the first end, and a boss extending from an inner wall of the rotating member in proximity to the first end. The fixing member can be a cylinder having a through hole provided therethrough, the fixing member comprising a third end facing the connecting plate and a fourth end opposite to the third end, and the fourth end can be a step surface extending from the third end. The fixing member can be sleeved in the rotating member, and the fourth end can abut the boss of the rotating member, such that the fixing member can be prevented from releasing from the rotating member and a rotation of the rotating member relative to the fixing member about an axis of the rotating member can be enabled.

In some embodiments, at least one protrusion can be provided on the inner wall of the rotating member, and at least one ridge can be provided on a circumference of the engaging member. A rotation of the rotating member relative to the fixing member can cause each one of the at least one ridge to abut against or disengage from a respective one of the at least one protrusion to bring the quick release structure into the locked state or the detached state.

In some embodiments, each of the at least one protrusion can comprise a fitting surface facing the camera element, and an abutting surface can be provided on a side of each of the at least one ridge facing the camera element. The abutting surface can mate with the fitting surface to bring the quick release structure into the locked state or the detached state.

In some embodiments, the fitting surface can be an inclined surface inclined at a predetermined angle with respect to a rotation axis of the rotating member, and/or the abutting surface can be an inclined surface inclined at the predetermined angle with respect to the rotation axis of the rotating member.

In some embodiments, a sliding slot can be formed between the at least one protrusion and the at least one ridge, and an access opening in communication with the sliding slot can be formed at the rotating member. The ridge can enter into or retreat from the sliding slot via the access opening.

In some embodiments, the sliding slot can be an arc-shaped slot, and/or
the access opening can be an arc-shaped slot.

In some embodiments, three said protrusions can be provided. One said access opening can be formed between two adjacent protrusions.

In some embodiments, a protruding ring can be formed on an inner wall of the fixing member at a position in proximity to the third end, a first positioning hole can be provided on the protruding ring, and the engaging member can comprise a connecting surface facing the rotating member and a first positioning post provided on the connecting surface. The first positioning post can be inserted into the first positioning hole when the engaging member is locked with the rotating member.

In some embodiments, the connectors can comprise a first connector provided on the connecting plate and a second connector provided on the engaging member. The first connector can be coupled to the second connector when the engaging member is locked with the rotating member to provide an electrical connection between the camera element and the gimbal.

In some embodiments, the engaging member can further comprise an elastic member, the elastic member being fixed on the connecting surface, and the first connector being fixed on the elastic member. The elastic member can be compressed under a pressure of the rotating member when the quick release structure is in the locked state.

In some embodiments, the elastic member can be a shock-absorbing pad.

In some embodiments, a second positioning hole can be provided on the first connector, and a second positioning post can be provided on the second connector. The second positioning post can be inserted into the second positioning hole when the quick release structure is in the locked state.

In some embodiments, the rotating member can further comprise a shifting part protruding from an outer wall of the rotating member.

In some embodiments, the shifting part can be a trapezoidal boss.

In some embodiments, the rotating member can comprise a plug, an end of the plug protruding from the inner wall of the rotating member, and a restraining part can be provided on an outer wall of the fixing member. The restraining part can mate with the plug to limit a rotation of the rotating member relative to the fixing member.

In some embodiments, a connecting hole can be provided on the shifting part through which the end of the plug can protrude from the inner wall of the rotating member.

In some embodiments, the plug can comprise an end face and a tip retractably projected from the end face.

In some embodiments, the tip can be provided with a spherical shape.

In some embodiments, the restraining part can comprise a first restraining hole, a second restraining hole and a guiding groove, the first restraining hole and the second restraining hole being respectively provided at two opposite ends of the guiding groove and in communication with the guiding groove. The plug can slide along the guiding groove when the rotating member is rotated with respect to the fixing member, and the rotation of the rotating member relative to the fixing member can be stopped when the plug reaches the first restraining hole or the second restraining hole.

In some embodiments, the plug can abut against a bottom surface of the guiding groove and can be elastically compressed when sliding along the guiding groove. The plug can be engaged into the first restraining hole or the second restraining hole under its own restoring force when the plug reaches the first restraining hole or the second restraining hole.

Another aspect of the disclosure discloses an unmanned aerial vehicle (UAV) comprising a body and an imaging device, the imaging device comprising a gimbal and a camera element, the gimbal comprising a rotatable frame assembly and a quick release structure. The camera element can be detachably mounted on the frame assembly via the quick release structure. Each of the camera element and the frame assembly can be provided with a connector, such that the camera element can be electrically connected to the gimbal via the connectors when the camera element is mounted on the frame assembly.

In some embodiments, an image captured by the camera element can be provided to a wireless transmitter onboard the UAV via the connector provided on the camera element, the connector provided on the frame assembly and an image processor of the gimbal and can be transmitted to a remote controller or a display device by the wireless transmitter.

In some embodiments, the frame assembly can comprise a first frame to which the camera element can be detachably mounted via the quick release structure. The camera element can be electrically connected to the gimbal via the connectors when the camera element is mounted to the first frame.

In some embodiments, the frame assembly can further comprise a second frame rotatably connected to the first frame. The second frame can be connected to a body of an unmanned aerial vehicle.

In some embodiments, the frame assembly can further comprise a third frame rotatably connected to the second frame. The second frame can be rotatably connected to the body via the third frame.

In some embodiments, a rotation axis of the first frame, a rotation axis of the second frame and a rotation axis of the third frame can be perpendicular to each other.

In some embodiments, the gimbal can further comprise a connecting member and a motor, the connecting member being connected to the body. The third frame can be rotatably connected to the body via the motor.

In some embodiments, the quick release structure can comprise a fixing part connected to the frame assembly and an engaging member detachably connected to the fixing part, the engaging member connecting the camera element to the fixing part. The engaging member can abut against or release from the fixing part to bring the quick release structure into a locked state or a detached state.

In some embodiments, the fixing part can comprise a rotating member, a fixing member, and a connecting plate, the fixing member being sleeved in the rotating member, the rotating member being connected to the connecting plate via the fixing member, and the connecting plate being connected to the frame assembly. The rotating member can mate with the engaging member to bring the quick release structure into the locked state or the detached state.

In some embodiments, the rotating member can be rotatable with respect to the fixing member. A rotation of the rotating member can abut or release the rotating member with the engaging member to bring the quick release structure into the locked state or the detached state.

In some embodiments, the rotating member can be a cylinder having a through hole provided therethrough, the rotating member comprising a first end facing the connecting plate and a second end opposite to the first end, and a boss extending from an inner wall of the rotating member in proximity to the first end. The fixing member can be a cylinder having a through hole provided therethrough, the fixing member comprising a third end facing the connecting plate and a fourth end opposite to the third end, and the fourth end can be a step surface extending from the third end. The fixing member can be sleeved in the rotating member, and the fourth end can abut the boss of the rotating member, such that the fixing member can be prevented from releasing from the rotating member and a rotation of the rotating member relative to the fixing member about an axis of the rotating member can be enabled.

In some embodiments, at least one protrusion can be provided on the inner wall of the rotating member, and at least one ridge can be provided on a circumference of the engaging member. A rotation of the rotating member relative to the fixing member causes each one of the at least one ridge to abut against or disengage from a respective one of the at least one protrusion to bring the quick release structure into the locked state or the detached state.

In some embodiments, each of the at least one protrusion can comprise a fitting surface facing the camera element, and an abutting surface can be provided on a side of each of the at least one ridge facing the camera element. The abutting surface can mate with the fitting surface to bring the quick release structure into the locked state or the detached state.

In some embodiments, the fitting surface can be an inclined surface inclined at a predetermined angle with respect to a rotation axis of the rotating member, and/or the abutting surface can be an inclined surface inclined at the predetermined angle with respect to the rotation axis of the rotating member.

In some embodiments, a sliding slot can be formed between the at least one protrusion and the at least one ridge, and an access opening in communication with the sliding slot can be formed on the rotating member. The ridge can enter into or retreat from the sliding slot via the access opening.

In some embodiments, the sliding slot can be an arc-shaped slot, and/or the access opening can be an arc-shaped slot.

In some embodiments, three said protrusions can be provided. One said access opening can be formed between two adjacent protrusions.

In some embodiments, a protruding ring can be formed on an inner wall of the fixing member at a position in proximity to the third end, a first positioning hole can be provided on the protruding ring, and the engaging member can comprise a connecting surface facing the rotating member and a first positioning post provided on the connecting surface. The first positioning post can be inserted into the first positioning hole when the engaging member is locked with the rotating member.

In some embodiments, the connectors can comprise a first connector provided on the connecting plate and a second connector provided on the engaging member. The first connector can be coupled to the second connector when the engaging member is locked with the rotating member to provide an electrical connection between the camera element and the gimbal.

In some embodiments, the engaging member can further comprise an elastic member, the elastic member being fixed on the connecting surface, and the first connector being fixed on the elastic member. The elastic member can be compressed under a pressure of the rotating member when the quick release structure is in the locked state.

In some embodiments, the elastic member can be a shock-absorbing pad.

In some embodiments, a second positioning hole can be provided on the first connector, and a second positioning post can be provided on the second connector. The second positioning post can be inserted into the second positioning hole when the quick release structure is in the locked state.

In some embodiments, the rotating member can further comprise a shifting part protruding from an outer wall of the rotating member.

In some embodiments, the shifting part can be a trapezoidal boss.

In some embodiments, the rotating member can comprise a plug, an end of the plug protruding from the inner wall of the rotating member, and a restraining part can be provided on an outer wall of the fixing member. The restraining part can mate with the plug to limit a rotation of the rotating member relative to the fixing member.

In some embodiments, a connecting hole can be provided on the shifting part through which the end of the plug can protrude from the inner wall of the rotating member.

In some embodiments, the plug can comprise an end face and a tip retractably projected from the end face.

In some embodiments, the tip can be provided with a spherical shape.

In some embodiments, the restraining part can comprise a first restraining hole, a second restraining hole and a guiding groove, the first restraining hole and the second restraining hole being respectively provided at two opposite ends of the guiding groove and in communication with the guiding groove. The plug can slide along the guiding groove when the rotating member is rotated with respect to the fixing member, and the rotation of the rotating member relative to the fixing member can be stopped when the plug reaches the first restraining hole or the second restraining hole.

In some embodiments, the plug can abut against a bottom surface of the guiding groove and can be elastically compressed when sliding along the guiding groove. The plug can be engaged into the first restraining hole or the second restraining hole under its own restoring force when the plug reaches the first restraining hole or the second restraining hole.

With the gimbal, imaging device and UAV provided in the disclosure, the camera element can be detachably mounted on the frame assembly via the quick release structure. Each of the camera element and the frame assembly can be provided a connector, such that an electrical connection can be formed between the camera element and the gimbal via the connectors when the camera element is mounted on the frame assembly. The quick release structure can detachably mount the camera element to the gimbal and form an electrical connection therebetween, such that a quick assembling/disassembling of the gimbal with the camera element and a synchronous operation of the gimbal and the camera element can be effected.

LIST OF REFERENCE NUMERALS

TABLE 1

| | |
|---|---|
| Imaging device | 100 |
| Gimbal part | 101 |
| Camera part | 102 |
| Gimbal | 10 |
| Connecting member | 11 |
| Motor | 12 |
| First frame | 13 |
| Second frame | 14 |
| Third frame | 15 |
| Quick release structure | 16 |
| Fixing part | 1601 |
| Rotating member | 161 |
| First end | 1611 |
| Second end | 1612 |
| Boss | 1613 |
| Shifting part | 1614 |
| Connecting hole | 1615 |
| Protrusion | 1616 |
| Fitting surface | 161a |
| Sliding slot | 1617 |
| Access opening | 1618 |
| Plug | 1619 |
| Fixing member | 162 |
| Third end | 1621 |
| Fourth end | 1622 |
| Protruding ring | 1623 |
| First positioning hole | 162a |
| Restraining part | 1624 |
| First restraining hole | 162b |
| Second restraining hole | 162c |
| Guiding groove | 162d |
| Engaging member | 163 |
| Body | 1631 |
| Ridge | 1632 |
| Abutting surface | 163a |
| Connecting surface | 1633 |
| First positioning post | 1634 |
| Elastic member | 1635 |
| First connector | 1636 |
| Second positioning hole | 1637 |
| Connecting plate | 164 |
| Fixing surface | 1641 |
| Second connector | 1642 |
| Second positioning post | 1643 |
| Camera element | 30 |

Embodiments of the present disclosure will be described with reference to the drawings.

DETAILED DESCRIPTION OF THE DISCLOSURE

Illustrative embodiments of the disclosure are described with reference to the drawings. The embodiments and features can be combined with one another provided they are technically compatible.

Figure 1:
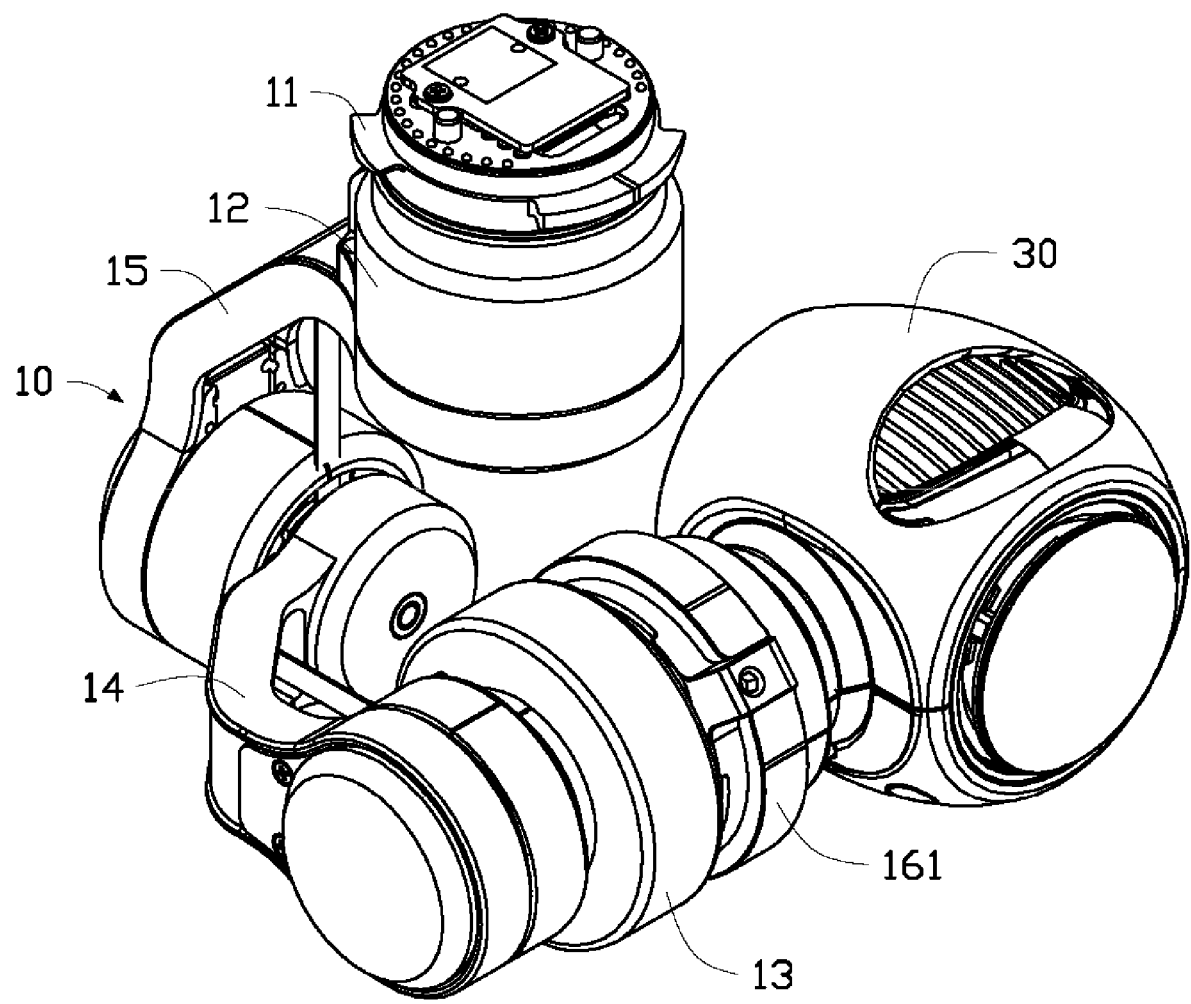
FIG. 1 shows an imaging device in accordance with an embodiment of the disclosure.
Figure 2:
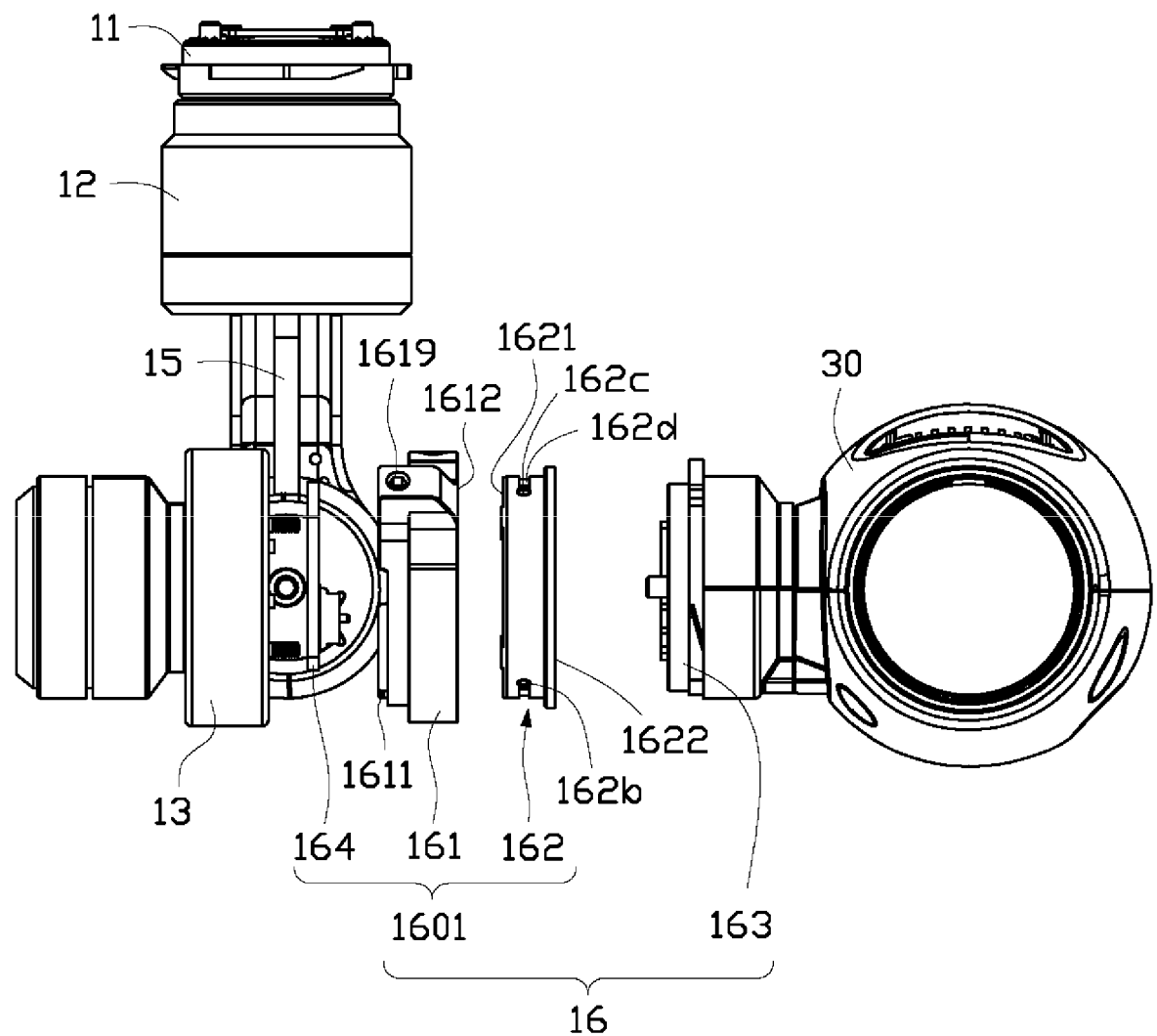
FIG. 2 is an exploded view of the imaging device of FIG. 1.
Figure 3:
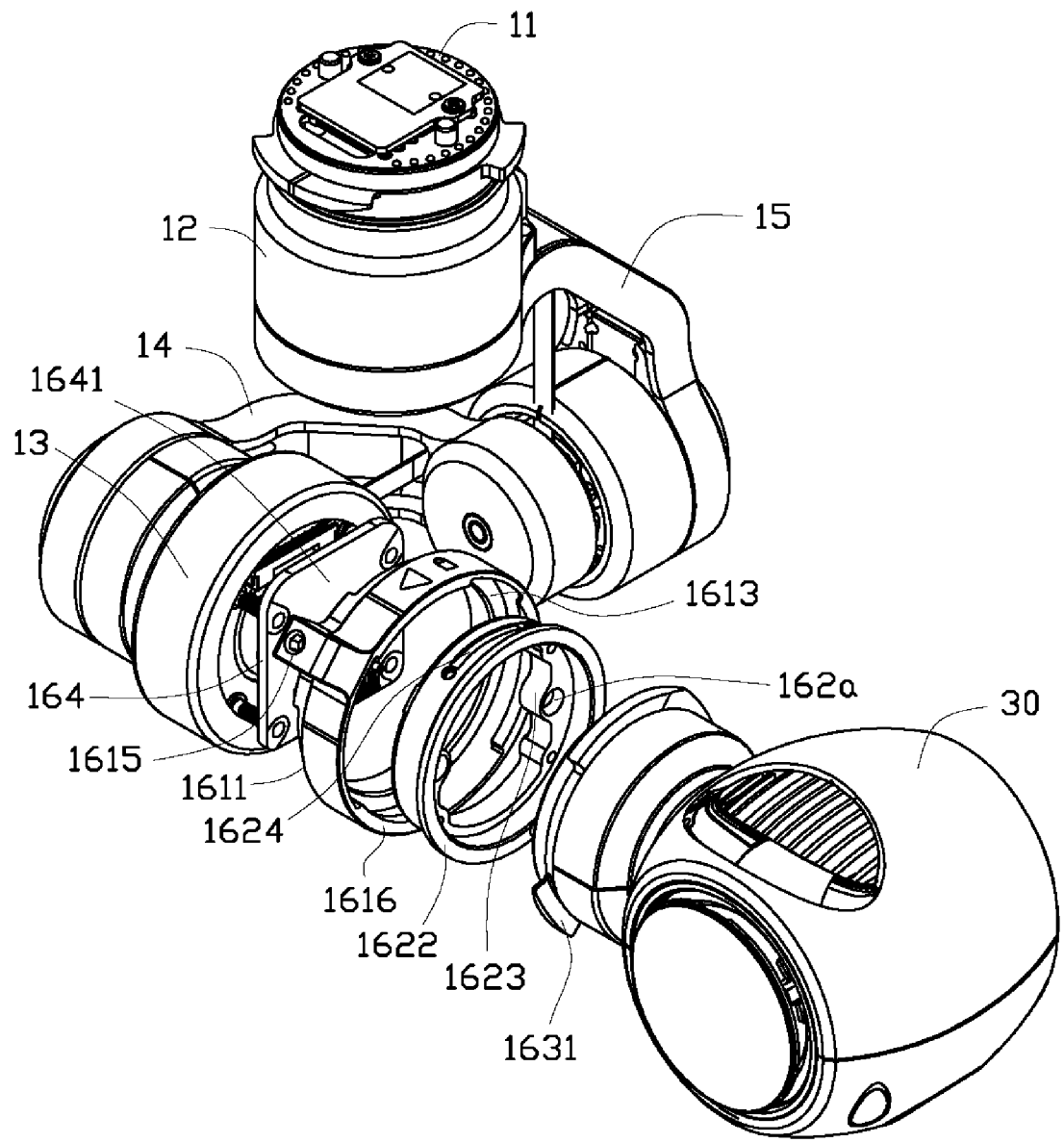
FIG. 3 is an exploded view of the imaging device of FIG. 1 from another perspective.

Referring to FIGS. 1 to 3, an imaging device 100 in accordance with an embodiment of the disclosure can be provided to a body of an unmanned aerial vehicle (UAV) (not shown). The UAV can be used in imaging, photography, monitoring and sampling. The imaging device 100 can comprise a gimbal 10 and a camera element 30 which can be carried by the gimbal 10.

The gimbal 10 can comprise a connecting member 11, at least one motor 12, a first frame 13, a second frame 14, a third frame 15, and a quick release structure 16. The connecting member 11 can be connected to the body of the UAV. The second frame 14 can be rotatably connected to the first frame 13 and the third frame 15. The first frame 13 can be connected to the quick release structure 16. The motor 12 can be connected to the connecting member 11 and the third frame 15. The third frame 15 can be rotatably connected to the body via the motor 12. In some embodiments, a driving shaft of the first frame 13, a driving shaft of the second frame 14 and a driving shaft of the third frame 15 can be perpendicular to each other in an initial state.

In some embodiments, a frame assembly can comprise three frames, for example, the first frame 13, the second frame 14 and the third frame 15. It will be appreciated that, the frame assembly can comprise two frames in other embodiments. For instance, the two frames can be rotatably connected to each other, the first frame being rotatably connected to the body of the UAV, and the second frame being connected to the camera element 30 via the quick release structure 16. A driving shaft of the first frame can be perpendicular to a driving shaft of the second frame.

Figure 4:
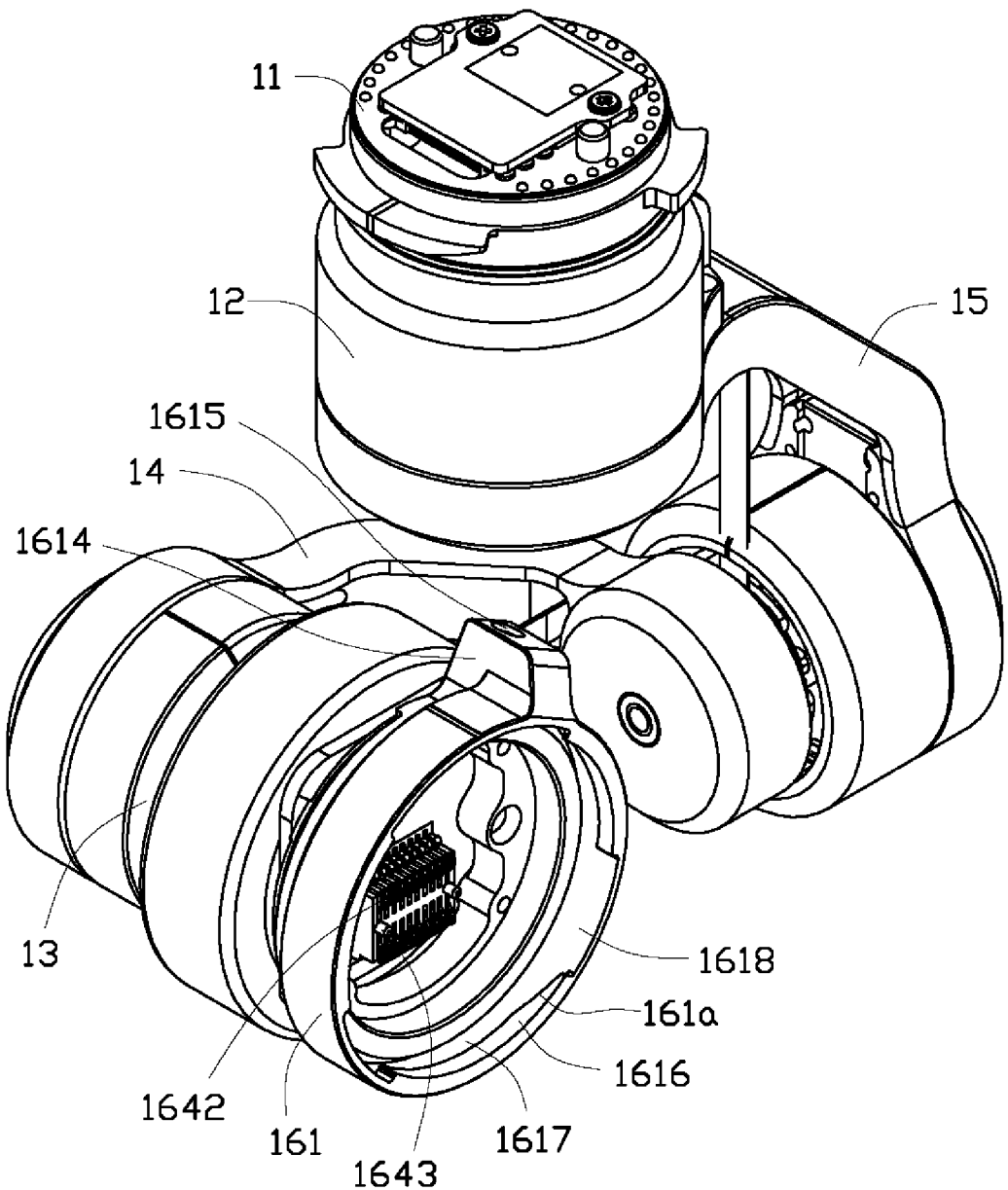
FIG. 4 shows a gimbal part of the imaging device of FIG. 1.
Figure 5:
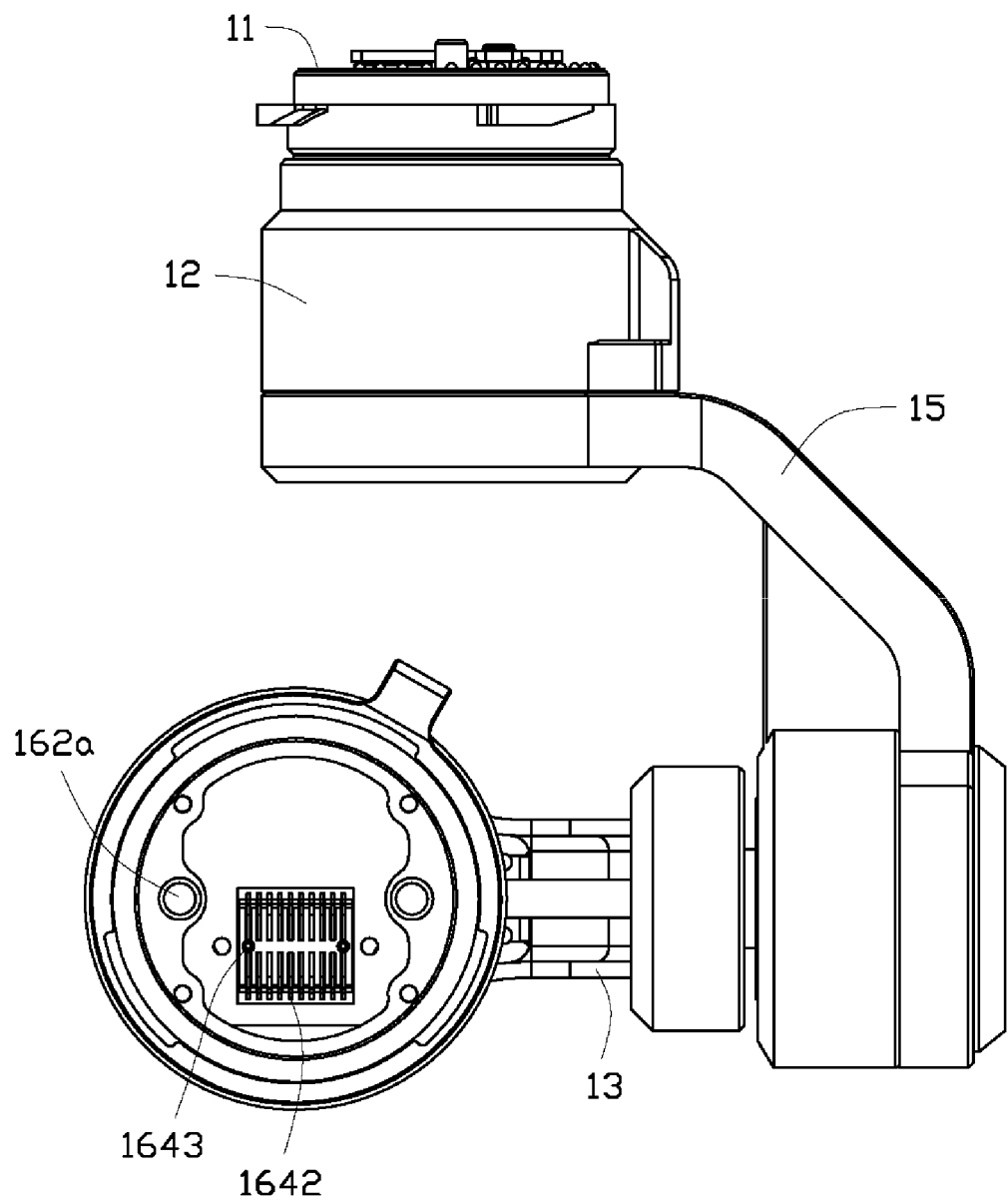
FIG. 5 shows the gimbal part of FIG. 4 from another perspective.
Figure 6:
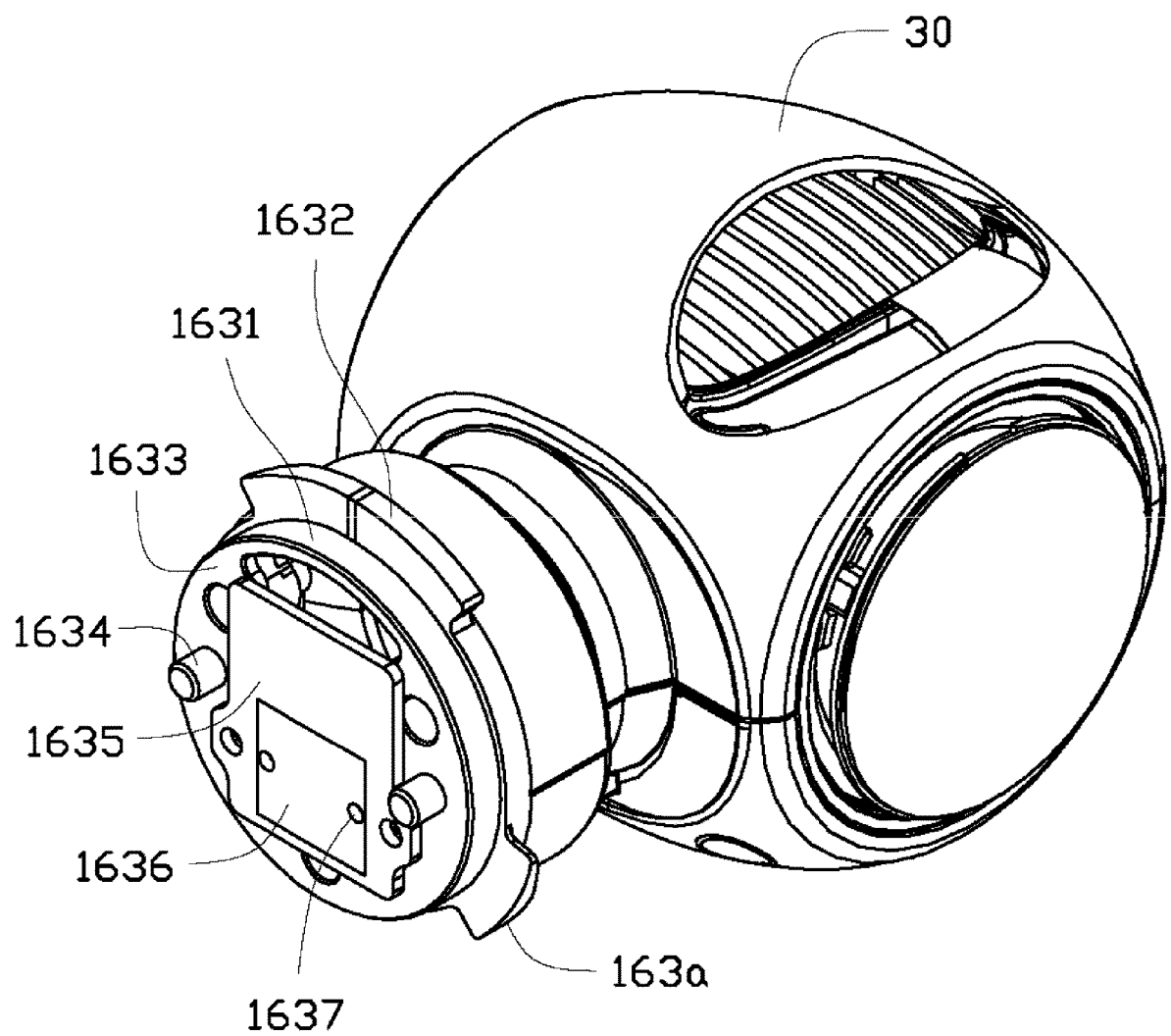
FIG. 6 shows a camera part of the imaging device of FIG. 1.

Referring to FIGS. 4 to 6, the quick release structure 16 can connect the camera element 30 to the first frame 13. The quick release structure 16 can comprise a fixing part 1601 and an engaging member 163 detachably connected to the fixing part 1601. The engaging member 163 can carry the camera element 30. The fixing part 1601 can comprise a rotating member 161, a fixing member 162 and a connecting plate 164. The rotating member 161 can be rotatably connected to the fixing member 162. The fixing member 162 can be fixedly connected to the connecting plate 164. The connecting plate 164 can be connected to the first frame 13. In some embodiments, a gimbal part 101 can comprise the connecting member 11, the motor 12, the first frame 13, the second frame 14, the third frame 15, the rotating member 161, the fixing member 162 and the connecting plate 164. A camera part 102 can comprise the engaging member 163 and the camera element 30. The camera part 102 can be detachably connected to the gimbal part 101.

The rotating member 161 can be a cylinder having a through hole provided therethrough. The rotating member 161 can comprise a first end 1611 facing the connecting plate 164 and a second end 1612 opposite to the first end 1611. A boss 1613 can extend from an inner wall of the rotating member 161 in proximity to the first end 1611. In some instances, the boss 1613 can be a ring. In some instances, the rotating member 161 can comprise a shifting part 1614 to facilitate a holding and rotating of the rotating member 161.

The shifting part 1614 can be provided on a circumference of the rotating member 161. In some instances, the shifting part 1614 can be provided as a trapezoidal boss protruding from the circumference of the rotating member 161. In some embodiments, one shifting part 1614 can be provided. It will be appreciated that, the number of the shifting part 1614 can vary in various circumstances. A connecting hole 1615 can be provided on the shifting part 1614. A central axis of the connecting hole 1615 can be substantially perpendicular to a central axis of the rotating member 161.

At least one protrusion 1616 can be provided on an inner wall of the second end 1612, each extending in a circumferential direction of the second end 1612. In some embodiments, the at least one protrusion 1616 can comprise three protrusions 1616. The protrusion 1616 can be an arc-like strip extending along the inner wall of the second end 1612. An end of the protrusion 1616 can comprise a fitting surface 161a facing away from the camera element 30. The fitting surface 161a can be an inclined surface which is inclined at a predetermined angle with respect to a rotation axis of the rotating member 161 for facilitating a connection between the rotating member 161 and the engaging member 163. It will be appreciated that, the number of the protrusions 1616 can vary in various circumstances.

A sliding slot 1617 can be formed between the protrusion 1616 and the boss 1613. The sliding slot 1617 can be an arc-shaped slot extending along the inner wall of the second end 1616. At least one access opening 1618 can be provided at the second end 1612. In some embodiments, the at least one access opening 1618 can comprise three access openings 1618, each of which can be formed between two adjacent protrusions 1616. It will be appreciated that, the number of the protrusions 1616 can vary in various circumstances. The access opening 1618 can be an arc-shaped slot extending along the inner wall of the second end 1612. It will be appreciated that, the access openings 1618 can be provided with other shapes.

In some instances, the rotating member 161 can comprise a plug 1619. An end of the plug 1619 can protrude from of an inner wall of the rotating member 161. The plug 1619 can be provided in and protruding from the connecting hole 1615. The plug 1619 can comprise an end face, an elastic member and a tip (not shown). The tip can be provided with a spherical structure retractably projected from the end face by the elastic member. In some embodiments, the plug 1619 can be elastically connected to the fixing member 162.

The fixing member 162 can be a cylinder having a through hole provided therethrough. The fixing member 162 can be received within the rotating member 161. The fixing member 162 can comprise a third end 1621 facing the connecting plate 164 and a fourth end 1622 opposite to the third end 1621. The third end 1621 can be a ring. A protruding ring 1623 can be provided on an inner wall of the fixing member 162 at a position in proximity to the third end 1621. A first positioning hole 162a can be provided on the protruding ring 1623 for providing guidance in connecting the fixing member 162 to other components. The fourth end 1622 can be a step surface extending from a circumference of the fixing member 162. In some embodiments, two first positioning hole 162a can be provided symmetrically with respect to a central axis of the fixing member 162.

In some instances, a restraining part 1624 can be provided on the circumference of the fixing member 162. The restraining part 1624 can be mated with the plug 1619 to limit a rotation of the rotating member 161 with respect to the fixing member 162. The restraining part 1624 can be provided on the fixing member 162 and comprise a first restraining hole 162b, a second restraining hole 162c and a guiding groove 162d provided on the fixing member 162. The first restraining hole 162b and the second restraining hole 162c can be respectively provided at two opposite ends of the guiding groove 162d. The guiding groove 162d can be a recess formed on the circumference of the fixing member 162 toward the inner wall of the fixing member 162. In some embodiments, the guiding groove 162d can be an arc-shaped slot. It will be appreciated that, the restraining part 1624 is not limited to the example as described hereinabove, and the number of the restraining part 1624 can vary in various circumstances.

The engaging member 163 can be detachably connected with the rotating member 161. The engaging member 163 can be connected to the camera element 30. The engaging member 163 can be a disc-shaped plate structure comprising a body 1631. At least one ridge 1632 can be provided on a circumference of the body 1631. The ridge 1632 can be matched with the access opening 1618 to enter into and retreat from the sliding slot 1617 via the access opening 1618. In some embodiments, three ridge 1632 can be provided, each of which matching with a respective one of the three access openings 1618. Each of the three ridges 1632 can be an arc-shaped ridge. An abutting surface 163a can be provided on a side of each ridge 1632 facing the camera element 30. The abutting surface 163a can mate with the fitting surface 161a. In some embodiments, the abutting surface 163a can be an inclined surface inclined at a predetermined angle with respect to the rotation axis of the rotating member. The body 1631 can comprise a connecting surface 1633 facing the rotating member 161. In some instances, the engaging member 163 can comprise a first positioning post 1634, an elastic member 1635 and a first connector 1636. The first positioning post 1634 and the elastic member 1635 can be provided on the connecting surface 1633. The first positioning post 1634 can be mated with the first positioning hole 162a to guide a connection between the engaging member 163 and the fixing member 162. The first connector 1636 can be fixed on the elastic member 1635 to form an electrical connection with the connecting plate 164. In some embodiments, two first positioning post 1634 can be provided. The two positioning posts 1634 can be spaced apart with the elastic member 1635 being provided therebetween. In some embodiments, the elastic member 1635 can be a shock-absorbing pad for increasing a connecting strength between the engaging member 163 and the fixing member 162. A second positioning hole 1637 can be provided on the first connector 1636. In some embodiments, two second positioning holes 1637 can be provided which are spaced apart from each other. It will be appreciated that, the number of the second position hole 1637 can vary in various circumstances.

The connecting plate 164 can be connected to the first frame 13. The connecting plate 164 can be provided to have a substantially rectangular shape. The connection plate 164 can comprise a fixing surface 1641 remote from the first frame 13. A second connector 1642 can be provided on the fixing surface 1641. In some instances, the connecting plate 164 can comprise a second positioning post 1643 which is provided on the second connector 1642. The second positioning post 1643 can be mated with the second positioning hole 1637 to position an electrical connection between the first connector 1636 and the second connector 1642. In some embodiments, two second positioning posts 1643 can be provided. Each of the two second positioning posts 1643 can be mated with a respective one of the two second positioning holes 1637.

The second connector 1642 can be electrically connected to the first connector 1636, such that the gimbal 10 and the camera element 30 can be electrically connected to each other. In some embodiments, the camera element 30 can be provided with the first connector 1636. The first connector 1636 and the second connector 1642 can be electrically connected to each other when the camera element 30 is mounted to the gimbal 10 via the quick release structure 16.

The camera element 30 can capture an image or a video and can be detachably connected to the engaging member 163. In some embodiments, the camera element 30 can be a camera. It will be appreciated that, the camera element 30 can be various loads such as a video camera or a liquid sprayer.

The connecting plate 164 can be fixed to the first frame 13. The fixing member 162 can be sleeved in the rotating member 161. The fourth end 1622 can abut the boss 1613 of the rotating member 161, such that the fixing member 162 is prevented from releasing from the rotating member 161 and a rotation of the rotating member 161 with respect to the fixing member 162 about an axis of the rotating member 161 is enabled. The fixing member 162 can be fixedly connected to the connecting plate 164 via the third end 1621. The second connector 1642 can be received in the fixing member 162. The body 1631 of the engaging member 163 can be detachably connected to the camera element 30. The connecting member 11 can be rotatably connected to the third frame 15 via the motor 12. The second frame 14 can be rotatably connected to the first frame 13 and the third frame 15.

The three ridges 1632 of the engaging member 163 can each enter into the sliding slot 1617 via a respective one of the three access openings 1618. Meanwhile, the two first positioning posts 1634 can each be received in a respective one of the two first positioning holes 162a, such that the engaging member 163 and the fixing member 162 can be connected to each other along a straight line to smooth the connection therebetween.

The rotating member 161 can be rotated by rotating the shifting part 1614. A rotation of the rotating member 161 in a clockwise or anti-clockwise direction can cause the plug 1619 to slide within the guiding groove 162d. The elastic member of the plug 1619 can be in a compressed state when the plug 1619 abuts against a bottom surface of the guiding groove 162d. The tip of the plug 1619 can be engaged into the first restraining hole 162b or the second restraining hole 162c under a restoring force of the elastic member of the plug 1619. The rotation of the rotating member 161 relative to the fixing body 162 can be stopped. In the meantime, the three protrusions 1616 can drive a movement of the camera element 30 toward the first frame 13 along a central axis of the quick release structure 16, such that the fitting surfaces 161a of the three protrusions 1616 can each abut against a respective one of the abutting surfaces 163a of the three ridges 1632 to bring the quick release structure 16 into a locked state. The second positioning posts 1643 can be inserted into the second positioning holes 1637. The first connector 1636 and the second connector 1642 can form an electrical connection to electrically connect the camera element 30 with the gimbal 10. The elastic member 1635 can be compressed under a pressure of the rotating member 161, such that the connection between the first connector 1636 and the second connector 1642 can be tightened. A sound can be generated when the tip of the plug 1619 is engaged into the first restraining hole 162b or the second restraining hole 162c, such that a user can determine a status of the connection between the protrusions 1616 and the ridges 1632.

When the quick release structure 16 is in the locked state, the rotating member 161 can be rotated in anti-clockwise or clockwise direction to disengage the tip of the plug 1619 from the first restraining hole 162b or the second restraining hole 162c and cause the tip to slide to the second restraining hole 162c or the first restraining hole 162b, thereby engaging the plug 1619 into the second restraining hole 162c or the first restraining hole 162b. Now, the quick release structure 16 can be in a detached state where the three ridges 1632 respectively release from the three protrusions 1616. The engaging member 163 can be disengaged from the rotating member 161 and the fixing member 162, and the camera element 30 can be removed from the gimbal part 101.

It will be appreciated that, the frame assembly of the gimbal 10 can comprise one frame, for example the first frame 13. In such instances, the camera element 30 can be detachably mounted on the frame via the quick release structure 16. The camera element 30 can be electrically connected with the gimbal 10 via connectors when the camera element 30 is mounted on the frame assembly.

It will be appreciated that, the frame assembly of the gimbal 10 can comprise two frames, for example the first frame 13 and the second frame 14 rotatably connected to the first frame 13. In such instances, the camera element 30 can be detachably mounted on the first frame 13 via the quick release structure 16. The camera element 30 can be electrically connected with the gimbal 10 via connectors when the camera element 30 is mounted on the first frame 13.

It will be appreciated that, the quick release structure 16 is not limited to the example described hereinabove. The quick release structure 16 can be a structure capable of detachably mounting the camera element 30 on the frame assembly and providing an electrical connection between the camera element 30 and the gimbal 10 when the camera element 30 is mounted on the frame assembly.

An aspect of the disclosure provides an UAV (not shown) comprising the imaging device 100 as described hereinabove. The camera element 30 can be connected to a vehicle body of the UAV via the gimbal 10. Images captured by the camera element 30 can be provided to an image processor onboard the gimbal via the quick release structure 16. The image processor can transfer the images to a wireless transmitter of the UAV, which transmits the images to a remote controller or a display device, such that a user can control the UAV based upon the images or view images captured by the camera element.

With the gimbal, imaging device and UAV provided in the disclosure, the camera element can be detachably mounted on the frame assembly via the quick release structure. Each of the camera element and the frame assembly can be provided a connector, such that an electrical connection can be formed between the camera element and the gimbal via the connectors when the camera element is mounted on the frame assembly. The quick release structure can detachably mount the camera element to the gimbal and form an electrical connection therebetween, such that a quick assembling/disassembling of the gimbal with the camera element and a synchronous operation of the gimbal and the camera element can be effected.

It will be apparent to those skilled in the art that the embodiments discussed hereinabove should not be constructed as limiting the scope of the disclosure but merely as illustrating examples of the disclosure. Those variations and substitutions made in accordance with the spirit of the disclosure are within the scope of the present disclosure.

What is claimed is:

1. A gimbal comprising:
a rotatable frame assembly configured to be electrically connected to a camera; and
a quick release structure configured to detachably mount the camera to the frame assembly, the quick release structure including:
an engaging member configured to be coupled to the camera and including a connecting surface configured to face away from the camera, an elastic member fixed on the connecting surface, and a first connector fixed on the elastic member; and
a fixing part configured to be coupled to the frame assembly and detachably connected to the engaging member, the fixing part including a connecting plate and a second connector fixed on the connecting plate,
wherein a rotation of at least a portion of the fixing part with respect to the engaging member allows the first connector to be electrically coupled to or decoupled from the second connector.

2. The gimbal of claim 1, wherein the first connector is embedded in the elastic member.

3. The gimbal of claim 1, wherein the elastic member includes a shock-absorbing pad.

4. The gimbal of claim 1, wherein:
the engaging member is configured to abut against and release from the fixing part to allow the quick release structure to enter a locked state and a detached state, respectively.

5. The gimbal of claim 4, wherein:
the fixing part includes a rotating member mating with the engaging member and being configured to rotate with respect to the camera, a rotation of the rotating member with respect to the camera allowing the engaging member to abut against or release from the fixing part.

6. The gimbal of claim 5, wherein:
the elastic member is configured to be compressed by the rotating member when the quick release structure is in the locked state.

7. The gimbal of claim 5, wherein:
the fixing part further includes a fixing member being sleeved in the rotating member; and
the connecting plate is connected to the rotating member via the fixing member and connected to the frame assembly.

8. The gimbal of claim 7, wherein:
the rotating member includes at least one protrusion provided on an inner wall of the rotating member;
the engaging member includes at least one ridge provided on a circumference of the engaging member; and
a rotation of the rotating member relative to the fixing member causes each one of the at least one ridge to abut against or disengage from a respective one of the at least one protrusion to allow the quick release structure to be attached to or detached from the camera.

9. The gimbal of claim 8, wherein:
each of the at least one protrusion includes a fitting surface facing away from the camera;
each of the at least one ridge includes an abutting surface facing the camera; and
the abutting surface mates with the fitting surface to bring the quick release structure into the locked state or the detached state.

10. The gimbal of claim 9, wherein:
the fitting surface includes an inclined surface inclined at a predetermined angle with respect to a rotation axis of the rotating member.

11. The gimbal of claim 8, wherein:
the rotating member further includes a boss extending from the inner wall of the rotating member;
a sliding slot is formed between the at least one protrusion and the boss;
an access opening in communication with the sliding slot is formed at the rotating member; and
the at least one ridge is configured to enter into or retreat from the sliding slot via the access opening.

12. The gimbal of claim 11, wherein:
the sliding slot is an arc-shaped slot; or
the access opening is an arc-shaped slot.

13. The gimbal of claim 8, wherein:
the fixing member further includes a protruding ring on an inner wall of the fixing member at a position in proximity to an end of the fixing member that faces away from the camera, the protruding ring including a first positioning hole,
the engaging member further includes a first positioning post provided on the connecting surface, and
the first positioning post is inserted in the first positioning hole when the engaging member is locked with the rotating member.

14. The gimbal of claim 13, wherein:
the first connector includes a second positioning hole;
the second connector includes a second positioning post; and
the second positioning post is configured to be inserted into the second positioning hole when the quick release structure is in the locked state.

15. The gimbal of claim 5, wherein the rotating member further includes a shifting part protruding from an outer wall of the rotating member.

16. The gimbal of claim 15, wherein the shifting part includes a trapezoidal boss.

17. The gimbal of claim 1, wherein the frame assembly includes a first frame configured to be coupled to the camera, a second frame rotatably connected to the first frame, and a third frame rotatably connected to the second frame and configured to be coupled to a carrier.

18. The gimbal of claim 17, wherein the first frame includes a first end and a second end opposite to the first end, the first end being rotatably connected to the second frame, and the second end connected to the connecting plate.

19. An imaging device comprising:
a camera; and
a gimbal configured to mount the camera, the gimbal including:
a rotatable frame assembly configured to be electrically connected to the camera; and
a quick release structure configured to detachably mount the camera to the frame assembly, the quick release structure including:
an engaging member configured to be coupled to the camera and including a connecting surface configured to face away from the camera, an elastic member fixed on the connecting surface, and a first connector fixed on the elastic member; and
a fixing part configured to be coupled to the frame assembly and detachably connected to the engaging member, the fixing part including a connecting plate and a second connector fixed on the connecting plate, wherein a rotation of at least a portion of the fixing part with respect to the engaging member allows the first connector to be electrically coupled to or decoupled from the second connector.

20. An unmanned aerial vehicle (UAV) comprising:
   a body; and
   an imaging device carried by the body, the imaging device including:
      a camera; and
      a gimbal configured to mount the camera, the gimbal including:
         a rotatable frame assembly configured to be electrically connected to the camera; and
         a quick release structure configured to detachably mount the camera to the frame assembly, the quick release structure including:
            an engaging member configured to be coupled to the camera and including a connecting surface configured to face away from the camera, an elastic member fixed on the connecting surface, and a first connector fixed on the elastic member; and
            a fixing part configured to be coupled to the frame assembly and detachably connected to the engaging member, the fixing part including a connecting plate and a second connector fixed on the connecting plate,
         wherein a rotation of at least a portion of the fixing part with respect to the engaging member allows the first connector to be electrically coupled to or decoupled from the second connector.

* * * * *